Jan. 3, 1956  P. S. DICKEY ET AL  2,729,222
MANUAL-AUTOMATIC APPARATUS FOR FLUID PRESSURE CONTROL
Filed Dec. 15, 1951  5 Sheets-Sheet 1
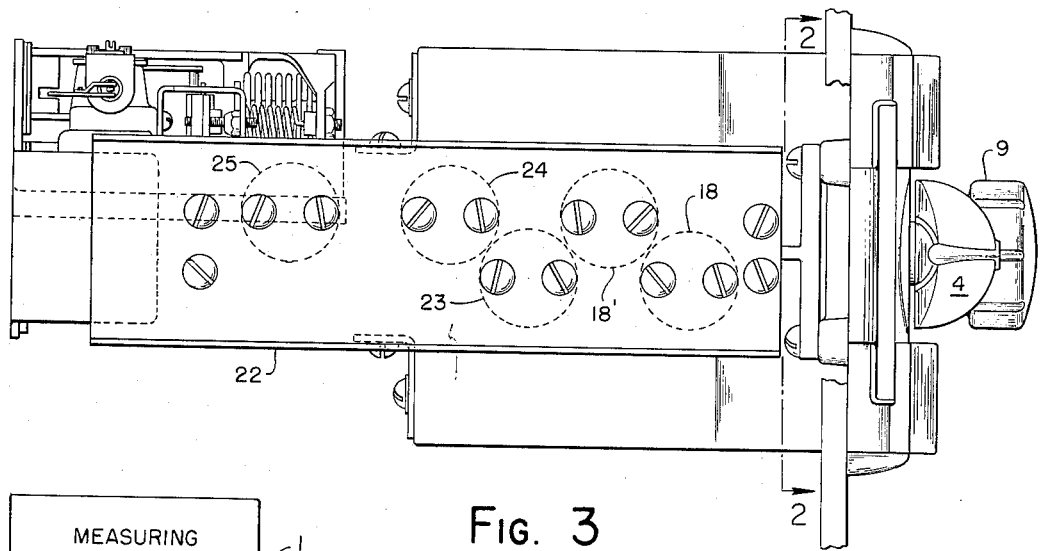
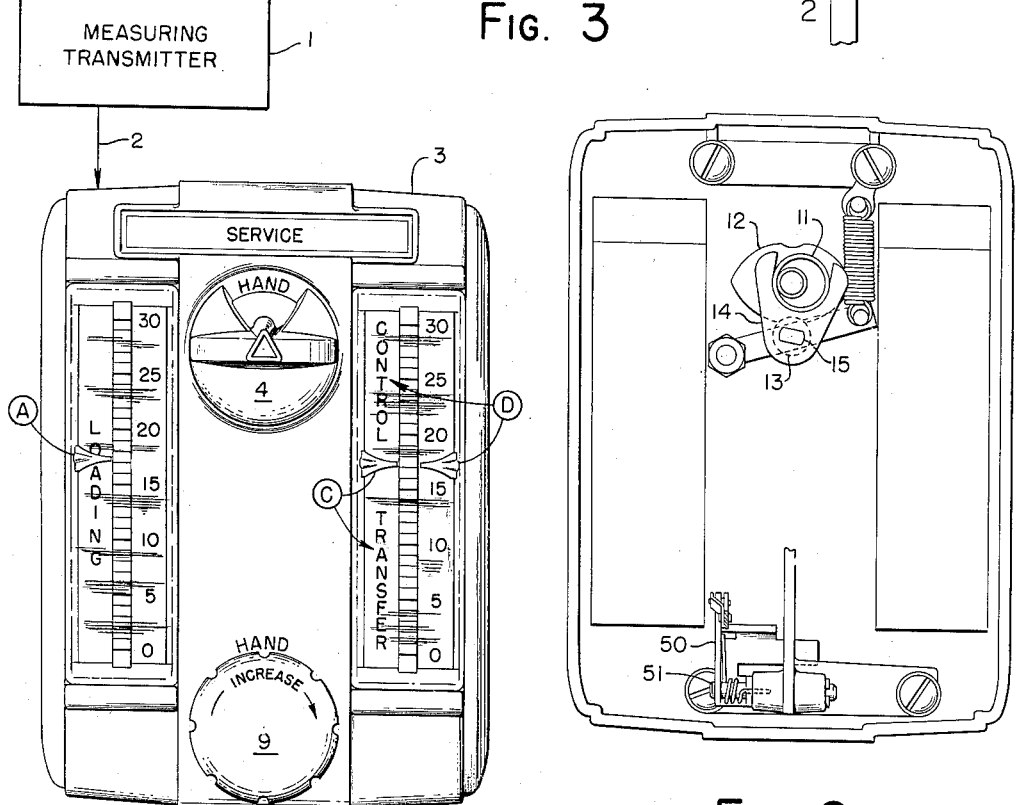
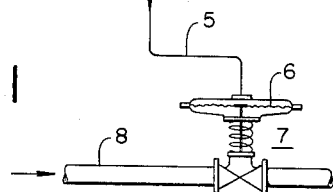
INVENTORS
PAUL S. DICKEY,
HARRY E. WEAVER,
HARVARD H. GORRIE
AND JACK F. SHANNON
BY Raymond W. Junkins
ATTORNEY

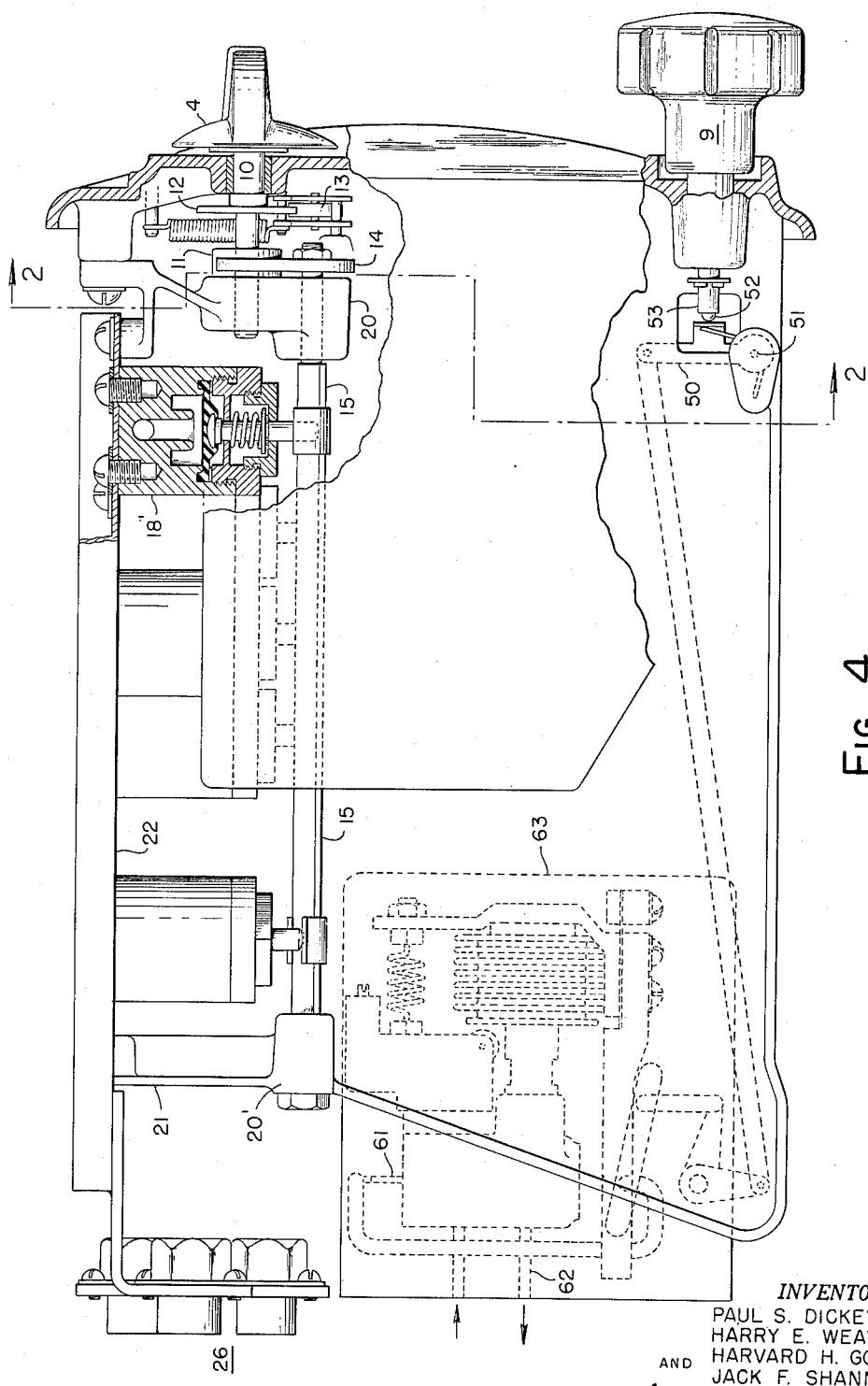

Jan. 3, 1956 P. S. DICKEY ET AL 2,729,222
MANUAL-AUTOMATIC APPARATUS FOR FLUID PRESSURE CONTROL
Filed Dec. 15, 1951 5 Sheets-Sheet 3

INVENTORS
PAUL S. DICKEY,
HARRY E. WEAVER,
HARVARD H. GORRIE
AND JACK F. SHANNON
BY Raymond W. Jenkins
ATTORNEY

| SELECTOR POSITION | VALVE POSITIONS | | | | |
|---|---|---|---|---|---|
| | 5 | 4 | 3 | 2 | 1 |
| HAND | OPEN | CLOSED | OPEN | OPEN | CLOSED |
| AUTO | CLOSED | OPEN | CLOSED | CLOSED | OPEN |

United States Patent Office 2,729,222
Patented Jan. 3, 1956

2,729,222

MANUAL-AUTOMATIC APPARATUS FOR FLUID PRESSURE CONTROL

Paul S. Dickey, East Cleveland, Harry E. Weaver, South Euclid, Harvard H. Gorrie, Cleveland Heights, and Jack F. Shannon, Euclid, Ohio, assignors to Bailey Meter Company, a corporation of Delaware Application October 15, 1951, Serial No. 251,406

5 Claims. (Cl. 137—82)

Our invention relates to control systems operable automatically or manually to maintain substantially constant any desired electrical, thermal, chemical, physical or other variable condition through the control of a corrective agent or agents. More particularly, our invention relates to control systems wherein a fluid pressure is utilized as the motive power for actuating devices to control the rate of application of corrective agents.

It is frequently necessary that a system be provided for regulating the supply of an agent affecting a condition, and the system should be operable either automatically in response to the condition for maintaining it at a desired constant value or manually for varying the condition as desired. The supply of the agent may be controlled by a device which is operated by fluid delivered at a pressure regulated by the system. When the system is switched from automatic to hand control, or vice versa, the pressure supplied to the device immediately after the switch-over should be the same as the pressure supplied before the switch was made, otherwise an operation of the device may be obtained to vary the agent so as to upset the whole system. It is therefore desirable that means be provided for regulating the pressure that will be supplied as well as indicating the various pressures involved.

An object of our invention is to provide an improved system for controlling a condition. Another object is to provide a system that may be adjusted for operation either automatically or manually to control the condition. Still another object is to provide an improved system in which a valving mechanism is selectively operative for supplying fluid pressure from automatic or manual control means to a regulating device, and separate gages are provided for indicating the various fluid pressures.

A particular object is to provide, in connection with an improved selector station for selectively effecting either manual or automatic control, a grouping of gages indicating the various fluid pressures for visual guidance at transition in order to reduce the magnitude of any pressure differential which might otherwise be detrimental.

Other objects will appear in the course of the following description.

In the drawings:

Fig. 1 is a front elevational view of our improved selector station, diagrammatically included in a very simple control layout.

Fig. 2 is a rear view of the face plate taken along the line 2—2, in the direction of the arrows of Fig. 3. It is also along the line 2—2 of Fig. 4.

Fig. 3 is a plan view of the top of a selector valve assembly.

Fig. 4 is a side elevation partly in section of the selector valve of Figs. 1, 2 and 3.

Figures 11, 12:
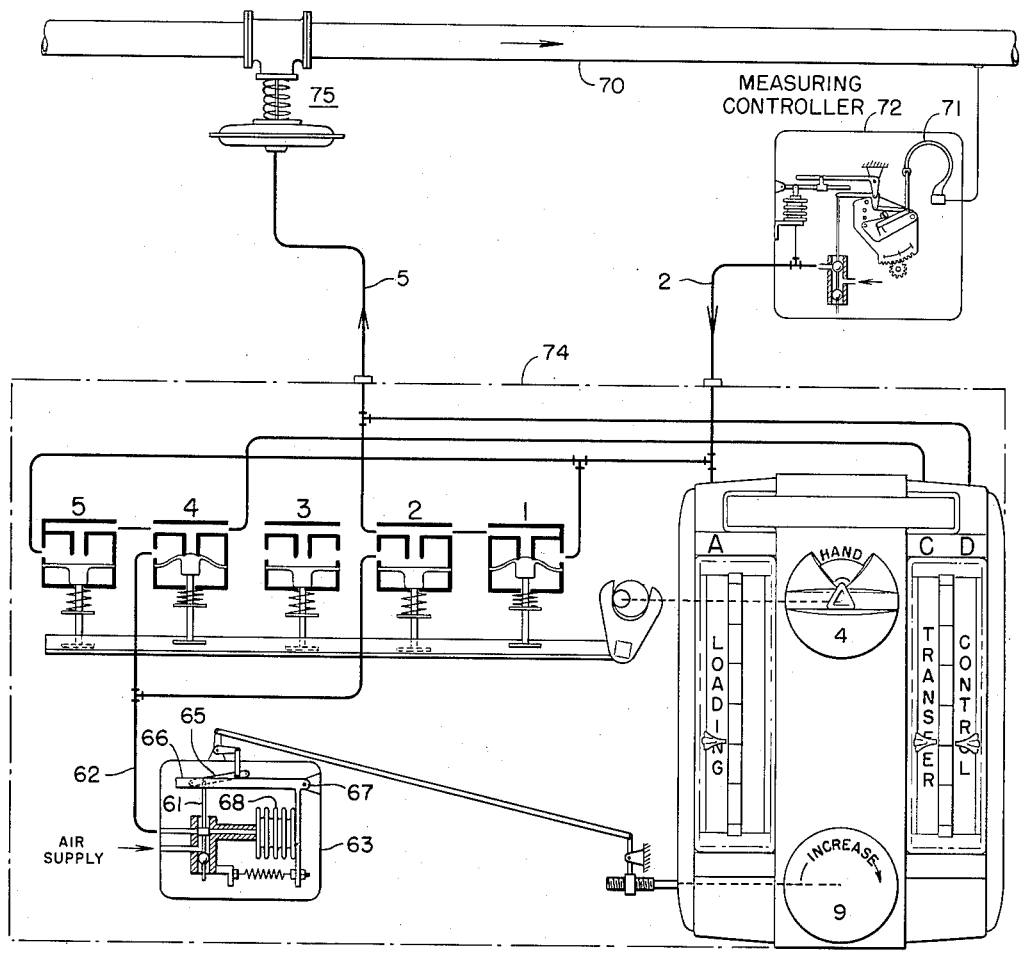

Fig. 11 diagrammatically illustrates the selector station in a control system.

Fig. 12 is a chart of valve positions in connection with Fig. 11.

Figure 13:
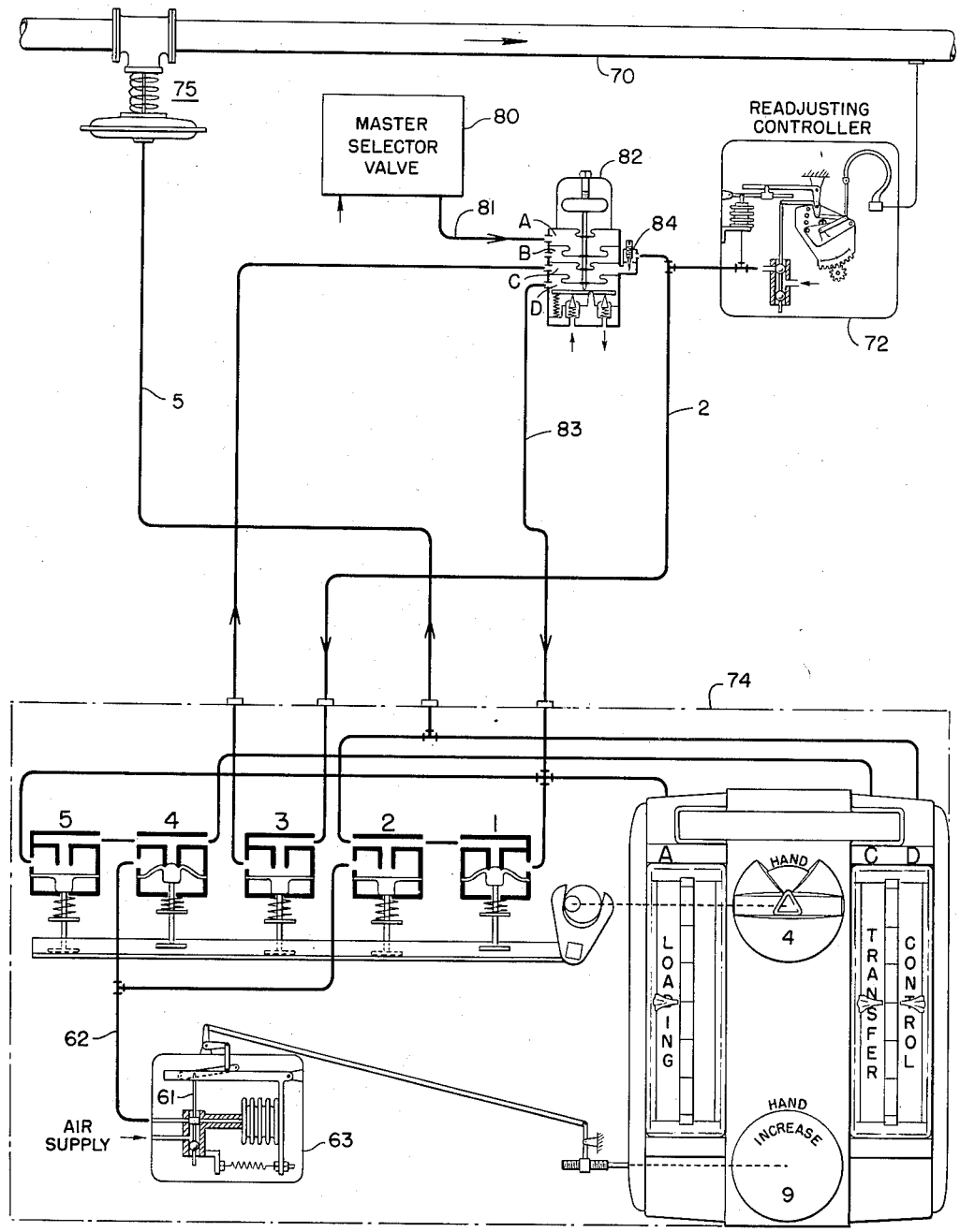

Fig. 13 is similar to Fig. 11 showing the selector station in a slightly different control installation.

Figure 6:
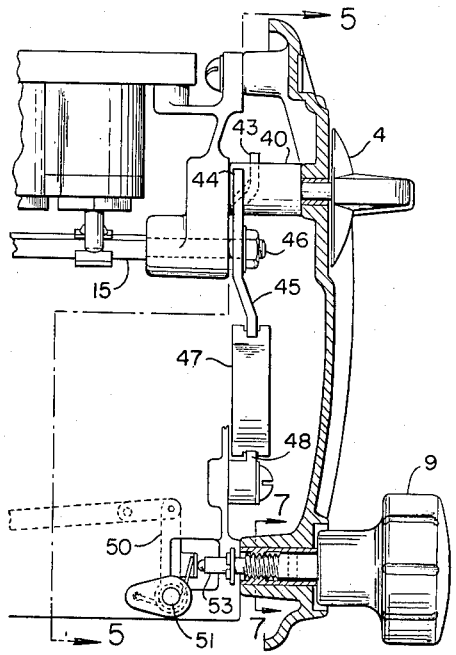
Figs. 5 and 6 are similar to Figs. 2 and 4 except that they illustrate a modification of part of the assembly.
Figures 7, 14, 15:
Fig. 7 is a view, to enlarged scale, along the line 7—7 in the direction of the arrows, of Fig. 6.

Fig. 14 is an end view, and Fig. 15 is a side elevation, of the cam 40 of Fig. 6.

Referring now to Fig. 1 we show therein quite diagrammatically a simple fluid flow control system in which a measuring transmitter 1 is sensitive to the instantaneous value of a variable and continuously establishes in a pipe 2 a fluid pressure within the range 0–30 p. s. i. proportionately representative of some desired range of values of the variable. Such a range may be a range from zero to maximum expected value or a suppressed range within the confines of such extremes.

At a local or remote point we provide the manual-automatic selector station 3 to which the pipe 2 is connected. The indicator pointer A makes the value of the measurement continuously visual by movement relative to the graduation 0–30, and the scale may be graduated in terms of the measurement.

In general the device 3 provides selective possibilities and when the selective knob 4 is in "automatic" position, then the loading pressure in pipe 2 is passed through the device 3 to the pipe 5 for impression upon a diaphragm 6 of a valve 7 controlling the rate of flow of fluid through a conduit 8.

When it is desired to place the control of valve 7 under "hand" domination from the location 3 it is possible to turn the knob 4 to its "hand" position and thereafter control the pressure in the pipe 5 by means of a hand control knob 9. Under either "hand" or "automatic" operation the value of the control pressure in pipe 5 is shown by pointer D along the graduation 0–30 p. s. i. Prior to the operation of knob 4 from "automatic" to "hand," the operator manually adjusts knob 9 to establish a control pressure (shown at C) similar to the pressure D, so that a smooth transfer will be made when value C=D.

The pointers for indicating the various fluid pressures may be actuated by Bourdon tubes sensitive to the fluid pressures, and the mechanisms as units may be like those of the copending application of T. A. Green et al. SN 176,382, filed July 28, 1950.

Figure 10:
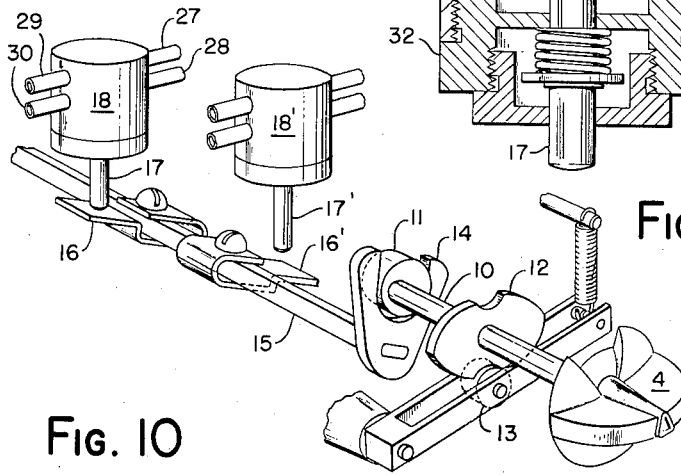
Fig. 10 is an isometric view of a portion of Fig. 4.

Actuation of the selector knob 4 manually between the "hand" and "automatic" positions thereof effectively opens or closes fluid pressure valves and the said valves, along with the mechanism for positioning them, will now be explained in connection with Figs. 2, 3, 4, 8, 9 and 10. Desired operation is to actuate the fluid pressure valves definitely to an open or a closed position without allowing the mechanism to come to rest at any intermediate position. Thus certain toggle-like or notching mechanism is provided for insuring a positive positioning of the movable portions of the valves from one extreme to another representative of "hand" and "automatic" positions. Fig. 10 shows the assembly in a somewhat diagrammatic and isometric view wherein the knob 4 has a shaft 10 carrying an eccentric 11 at its other extremity. Proper bearings are provided as shown in Fig. 4.

The shaft 10 also carries, intermediate its ends, a notching cam 12. A roller 13 is spring-loaded against the cam 12 and the cooperation of the two is such that the shaft 10 and cam 12 will come to rest in one or the other of two positions 180° apart wherein the roller 13 is in a notch of the cam 12. Thus the eccentric 11 may come to rest in only the position shown in Fig. 10 or an alternate position 180° therefrom.

The eccentric 11 cooperates with a forked arm 14 carried on the end of a square shaft 15 to rock the latter to one or the other of two positions approximately 30° angular throw. As shown in Fig. 10 the shaft 15 may carry a plurality of valve operating plates 16 engageable with the movable valve stem 17 of the valve assembly 18. In Fig. 10 the position of the eccentric 11 and forked arm 14 is such that plate 16 has moved valve stem 17 upwardly to shut off position (see Fig. 8) of the valve assembly 18, while plate 16' is out of engagement with valve stem 17' of valve assembly 18' leaving the latter in wide position (see Fig. 9).

It will be apparent from Fig. 10 that a plurality of valve operating plates 16 may be spaced along the square shaft 15 and cooperate with a similar number of valve assemblies 18 and that the arrangement may be that all of the valves be open in one position of the eccentric 11 and all of them closed in the other position of the eccentric, or that some may be open and some may be closed in either of the two positions of the eccentric. The possibilities of such arrangements will be more clearly apparent when Figs. 11, 12 and 13 are described.

From an examination of Fig. 4 it will be seen that the square shaft 15 is adequately journaled for angular motion in bosses 20, 20' of a main framework 21. Fig. 3 also shows how the valve assemblies 18 are suspended from a plate 22 rigidly fastened to the frame 21. In Fig. 3 it will be seen that a total of five of the valve assemblies are supported from the plate 22 and that valves 18 and 23 are so located as to be shown in their closed position, while valves 18', 24 and 25 are in their open position.

Figs. 11, 12 and 13 show the piping interconnection between the various parts of the assembly in diagrammatic fashion. To avoid complication and confusion we have omitted any piping in the other figures of the drawing. In Fig. 4 we show at 26 a manifold for the various connections to the individual shut-off valves, each of which may have a maximum of four connection points such as 27, 28, 29 and 30 of Figs. 8 and 10. It would unnecessarily complicate Fig. 4 to show the piping between the terminal 26 and the entrance point or points of each of the five valve assemblies.

Figures 8, 9:
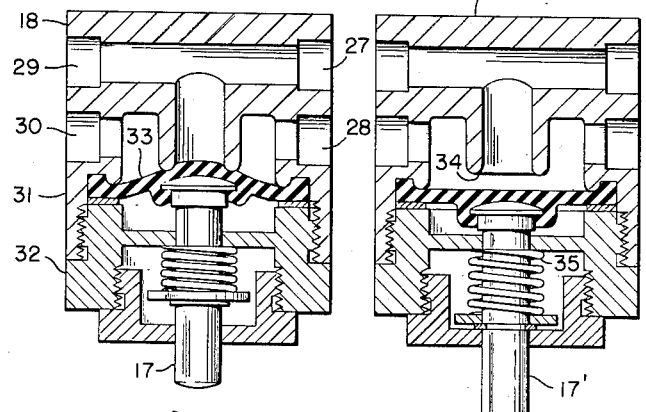
Figs. 8 and 9 are sectional views of one of the shut-off valves of Fig. 4 in closed and open positions.

Referring now particularly to Figs. 8 and 9 it will be seen that the valve 18 is shown in shut-off position, while the valve 18' is shown in open position. A particular feature of the valve construction is that the operating portions do not need to be sealed from the atmosphere as no leakage can occur around the stem 17.

The assembly 18 has a body portion 31 to which is threadably connected a part 32 for clamping therebetween the edge of a molded flexible valve disc 33 which may be moved into or out of engagement with a seat 34 formed centrally within the portion 31. The molded disc 33 contains an enlarged head of the shaft 17 and the disc 33 may preferably be made of neoprene or similar rubber-like material. The stem 17 is spring loaded by means of a spring 35 one end of which is carried by the stem 17 and the other end of which bears against the member 32. The arrangement is such that the spring 35 forces the disc 33 away from the seat 34 (Fig. 9) or may be said to be spring loaded to open. Closure of the valve is accomplished by rocking of the shaft 15 to one of its alternate positions, wherein a valve operating plate 16 axially moves the stem 17 to valve seating position. As shown in Fig. 10 the valve 18 is assumed to be closed, while the valve 18' is in open position.

Figure 5:
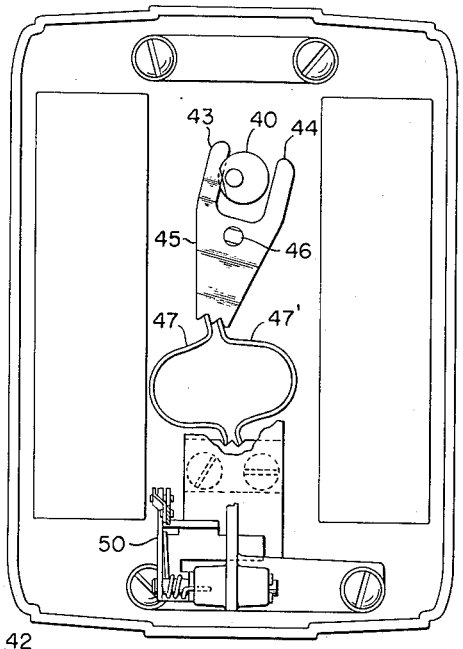

In Figs. 5 and 6 we show another form that the notching action for the shaft 15 may take. In either of the forms illustrated and described the selector knob 4 may be turned 180° in either direction and the shaft 15 will be angularly moved from its last position to its alternate position.

In the arrangement of Figs. 5 and 6 the knob 4 angularly positions a cam drum 40 shown in Figs. 14 and 15 as having milled thereon two flats 41, 42 staggered axially of the drum and providing rests for the staggered fingers 43, 44 of a fork 45 which is pivoted at 46. Here again the angular throw of the shaft 15 is approximately 30°. 180° motion of the knob 4, from the position shown in Figs. 5 and 6, rotates the drum 40 180° and swings the arm 45 through approximately 30° around its center 46, until the fork arm 44 seats in its alternate rest. Definite snap action is provided through the agency of two springs 47, 47' having one end of each seated in notches of the fork arm 45 and the other end of each spring seated in a fixed abutment 48.

When the selector station is in the "hand" position, then a manual pressure adjusting knob 9 may be moved to change the output pressure from the assembly. The knob 9 (Figs. 4 and 6) axially moves as it is rotated to angularly position an arm 50 around a center 51. The arm 50, and other parts positionable therewith, are spring urged into engagement with the rounded end 52 of the shaft 53 of the knob 9 to take up any lost motion and to provide a firm drive between the axial movement of shaft 53 and angular positioning of arm 50.

Fig. 7 is a section along the line 7—7, in the direction of the arrows, of Fig. 6 and shows the introduction as at 60 of a nylon friction plug through the shaft 53 so that the knob 9 will tend to remain in any position to which it is manually moved.

Angular positioning of the lever arm 50 about the center 51 provides hand control of a pilot 61 for regulating the value of a control pressure in a pipe 62 outlet of a pressure controlling mechanism 63 shown in dotted line on Fig. 4 because it is located beyond the main supporting frame of the assembly. The pressure regulating mechanism 63 forms the subject matter of the copending application of Harvard H. Gorrie, SN 169,751, filed June 22, 1950, now Patent Number 2,675,015, and which need not be further explained herein.

In Figs. 11 and 13 we show very diagrammatically the assembly 63 wherein in general it may be said that the hand knob 9 regulates the air control pressure established by the assembly 63 in a pipe 62.

Referring now to Fig. 11 it will be seen that manual turning of the knob 9 vertically positions one end of a floating cradle 65, the other end of which is positionable by an arm 66 of a bell crank pivoted at 67. Intermediate the ends of the cradle 65 is suspended the pilot 61 controlling air pressure in the output pipe 62 and also within a restoring bellows 68 which acts upon the other leg of the bell crank 66. Thus it may be said that fluid control pressure within the pipe 62 is established by manual manipulation of the knob 9.

Fig. 12 is a chart of the open or closed positions of the valves in the assembly under "hand" or "automatic" positioning. Fig. 11 shows the knob 4 in hand position and with valves 1 and 4 closed, while valves 2, 3 and 5 are open. In this particular control system valve 3 is not used.

In general, Fig. 11 diagrammatically illustrates control for fluid flowing through a conduit 70. Fluid pressure is effective upon the Bourdon tube 71 to actuate a "Pilotrol" 72 of the type disclosed and claimed in the patent to H. H. Gorrie 2,141,464. The assembly 72 contains range and sensitivity, set-point and proportional band, adjustments and functions to provide in the pipe 2 a control pressure representative of fluid pressure within conduit 70.

The Pilotrol is a compact assembly of pilot valve, restoring bellows and interrelated linkage which is used to transform into air loading pressures the movement imparted by a condition measuring device such as the Bourdon tube 71. The linkage of the assembly 72 is arranged for convenient adjustment of the control set-point and proportional band for sensitivity. The restoring bellows is used to combine greater speed in loading pressure changes with stability in the control system operation. While other forms of measuring devices may be used to establish the loading pressure within the pipe 2, we have chosen to indicate the "Pilotrol" 72 because it incorporates the set-point and proportional band adjustments usually desirable in a control system. The restoring bellows allows a big initial change, counteracted by the capillary resistance on a time basis, and ends up with the pilot land position and loading pressure both geared to the meter.

In Fig. 11 the selector valve assembly 74 is intermediate the measuring device 72 and a fluid control valve 75 for controlling the rate of flow of fluid in the conduit 70 and/or the pressure effective upon the Bourdon tube 71. The selector valve 74 has the primary function of allowing automatic positioning of the valve 75 from the measuring controller 72, or selectively to cut off the effect of the measuring controller 72 and placing the positioning of the valve 75 directly under manual actuation of the knob 9. As shown in Fig. 11 the selector valve 74 is in "hand" position with valves 1 and 4 closed and valves 2 and 5 open, while valve 3 is not used.

Under this condition it will be apparent that the loading pressure established by the measuring controller 72, in the pipe 2, is observable by the pointer A on the face of the selector station. At the same time fluid pressure within the pipe 2 freely passes through valves 5 and 4 to appear as a value indicated by the pointer C. The output pressure of the device 63, available in the pipe 62, freely passes through the valve 2 to be visible upon scale D as a "control pressure" and at the same time is directly effective in positioning the control valve 75. Thus under "hand" operation the scale A shows the "loading pressure" continuously established by the measuring controller 72. The scale C reads the same. The scale D indicates the manually adjusted pressure in the pipe 62 and which is effective in positioning the valve 75.

If the knob 4 is turned 180° (in either direction) to the "automatic" position, then valves 2 and 5 are closed, while valves 1 and 4 are open. Under this condition the pressure in pipe 2 is still indicated on scale A and passes through valves 1 and 2 to be directly effective in positioning the control valve 75. At the same time it is indicated upon indicator scale D so that values A and D are the same. The output of device 63, available in pipe 62, passes through valve 4 and appears as a reading upon scale C.

Thus under both "hand" and "automatic" positions of the selector device 74 the pressure established by device 72 shows up as a "loading pressure" upon scale A. The output of device 63, available in pipe 62 (during "automatic") shows up upon scale C. The pressure effective in positioning the valve 75 always shows up as a "control pressure" upon scale D. D is always the outgoing pressure available in pipe 5 for positioning the control valve 75. C is always the one which is not used. On "hand" control the C value will fluctuate to show what the value in pipe 2 is and $A=C$. On "automatic" control C will remain stationary wherever it was left when leaving the "hand" position.

In order to prevent any radical change in the positioning of the control valve 75, when changing from hand to automatic or from automatic to hand, it is only necessary to be sure that value $C=D$ before the transfer knob 4 is changed. For example, if the control is on "hand" (as shown in Fig. 11) and it is desired to switch to "automatic," knob 9 should be turned until the output of device 63, as shown up on scale D, is equal to C. If the control is on "automatic" and it is desired to change to "hand," knob 9 is adjusted until $C=D$ before moving knob 4 from "automatic" to "hand." In all cases gage D is the control pressure to the regulating valve 75 and the transfer is made after making C equal to D. This requires valves 4 and 5.

Fig. 13 is similar to Fig. 11 but shows the interconnection of a system receiving demands from two different sources. For example, a master selector valve 80 is representative of the primary demand for positioning the regulating valve 75. A readjusting controller 72, sensitive to pressure of the fluid in the pipe 70, is used as a readjusting impulse. The fluid pressure output of master 80, available in a pipe 81, as well as the output of device 72, available in the pipe 2, are algebraically combined in a relay 82 whose output is effective in a pipe 83.

The averaging relay 82 may be of the type described and claimed in the patent to Dickey 2,098,913. Fluid pressure from the pipe 81 is effective within the A chamber. The B chamber is open to the atmosphere. The pressure in pipe 2 is available in the C chamber of the relay through an adjustable resistance 84 so that the speed of the pressure change in 2 may be varied if desired. The valve 3 of selector station 74, in the "hand" position shown in Fig. 13, by-passes the adjustable restriction 84 so that the pressure in pipe 2 is directly effective in the C chamber of relay 82. Thus the adjustable restriction 84 is effective upon the C chamber of relay 82 only in the "automatic" position of the selector station when valve 3 thereof is in its closed position. Otherwise the piping arrangement and action is the same as described in connection with Fig. 11.

Before going from "hand" to "automatic" we adjust the knob 9 so that gage value $C=D$. Before going from "automatic" to "hand" we again adjust knob 9 so that gage $C=$gage $D$.

While we have chosen to illustrate and describe certain preferred forms which our invention may take, it will be understood that this is by way of example only, and not to be considered as limiting.

What we claim as new, and desire to secure by Letters Patent of the United States, is:

1. A selector station for a fluid pressure control system wherein a fluid pressure is produced by a variable representative of a condition and said condition is controlled either manually or automatically through said selector station, comprising in combination, a plurality of two-position valves, means for simultaneous mechanical actuation of the valves, hand operated switching means for giving the mechanical actuating means two positions of rest, a hand actuated means for establishing a fluid pressure, input piping upon which is imposed a fluid pressure responsive to a variable, output piping connected to some of the plurality of valves whose actuation selectively controls the condition in accordance with the manually controlled fluid pressure and the variable fluid pressure, and two groups of substantially linear parallel pressure gage scales including cooperating pointers indicating the input and output fluid pressures, the first group having one pointer indicating the input, the second group having two pointers indicating the output continuously with one pointer and the other pointer actuated selectively by said valves to indicate input when said means is in a manual position and to indicate output of the hand actuated means for establishing fluid pressure when said mechanical actuating means is in automatic position.

2. The selector station of claim 1 wherein each of the two-position valves consist of, a casing having a ported partition dividing the casing into two chambers, a wall of one chamber being a flexible diaphragm arranged to cooperate with the port, and a spring-loaded pushing member causing valving cooperation between the diaphragm and port under the mechanical actuation.

3. The selector station of claim 2 wherein a longitudinal rod member carries spaced abutments for mechanical actuation of the pushing members of the valves.

4. Selector station apparatus for producing an output loading pressure for effecting control of a variable by fluid pressure transmission and arranged for selective manual or automatic control, including in combination, hand operable switching means having two positions of rest, a double cam mounted on said switching means having two depressions 180° apart, a spring pressed roller engaging the surface of the cam, an eccentric drum also angularly moved by the switching means, a plurality of valves movable to open or closed valve position by said switching means, valve actuating means having a forked member cooperating with the eccentric drum for angularly moving the valve actuating means to one side or the other of a central position as the eccentric drum is angularly moved in either direction, a source of first fluid pressure continuously representative of the value of a variable to be controlled, hand actuated relay means adapted to establish a second fluid pressure, piping arrangement including output piping connecting the first fluid pressure through said valves to said output piping when the hand switching means is in one position of rest and connecting the second fluid pressure through said valves to said output piping in the other position of rest, and substantially linear parallel pressure indicating scales with cooperating pointers respectively indicating in comparing relation the two fluid pressures and the output fluid pressure.

5. The apparatus of claim 1 wherein the hand switching means angularly moves an eccentric drum cam having two flats approximately 30° apart between two positions, a forked member included in the means for simultaneous mechanical actuation of the valves and having two arms arranged to cooperate with the two flats one with one and the other with the other, and a spring means is provided to seat the one arm or the other in their related flat as the drum is rotated from one position to the other.

References Cited in the file of this patent

UNITED STATES PATENTS

| | | |
|---|---|---|
| 731,063 | May | June 16, 1903 |
| 2,022,624 | Longnecker | Nov. 26, 1935 |
| 2,074,240 | Saunders | Mar. 16, 1937 |
| 2,202,286 | Gorrie | May 28, 1940 |
| 2,261,648 | Goldstein | Nov. 4, 1941 |
| 2,325,264 | Merten | July 27, 1943 |
| 2,509,834 | More | May 30, 1950 |
| 2,588,799 | Booth | Mar. 11, 1952 |
| 2,612,902 | Ward | Oct. 7, 1952 |
| 2,613,082 | Guild | Oct. 7, 1952 |
| 2,638,117 | Horn | May 12, 1953 |
| 2,637,342 | Shannon | May 5, 1953 |